United States Patent
Park et al.

(10) Patent No.: US 6,558,284 B2
(45) Date of Patent: May 6, 2003

(54) HYDRAULIC CONTROL SYSTEM FOR AUTOMATIC TRANSMISSION

(75) Inventors: Jong-Sool Park, Kyungki-do (KR);
Chang-Wook Lee, Kyungki-do (KR);
Jae-Ho Cho, Kyungki-do (KR);
Jae-Duk Jang, Kyungki-do (KR);
Tae-Kyun Kim, Kyungki-do (KR);
Jin-Hee Lee, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/988,306

(22) Filed: Nov. 19, 2001

(65) Prior Publication Data
US 2002/0086758 A1 Jul. 4, 2002

(30) Foreign Application Priority Data
Dec. 30, 2000 (KR) .......................... 2000-87009

(51) Int. Cl.[7] .............................. F16H 31/00
(52) U.S. Cl. ....................................... 475/116
(58) Field of Search ......................... 475/116

(56) References Cited
U.S. PATENT DOCUMENTS

| | | | |
|---|---|---|---|
| 5,191,815 A | * | 3/1993 | Kouta .......................... 475/116 |
| 5,197,355 A | * | 3/1993 | Sherman et al. ............ 475/116 |
| 5,487,708 A | * | 1/1996 | Marusue ....................... 475/116 |
| 6,494,802 B2 | * | 12/2002 | Lee et al. .................... 475/116 |

* cited by examiner

Primary Examiner—Dirk Wright
(74) Attorney, Agent, or Firm—Birch, Stewart, Kolasch & Birch, LLP

(57) ABSTRACT

Disclosed is a hydraulic control system for controlling an automatic transmission comprising a first clutch for transmitting power through a one-way clutch in first, second and third speeds; a fourth clutch for discontinuing an operation of the one-way clutch and which acts as an engine brake; a second brake operating in second and fourth speeds; a second clutch for transmitting power in third and fourth speeds; a first brake for discontinuing the operation of the one-way clutch in the first speed and acting as an engine brake, and operating in low L and reverse R ranges; and a third clutch for operating in the reverse R range, wherein hydraulic pressure controlled by a first solenoid valve is supplied and exhausted through operation of a switch valve to the second clutch and the first brake, the second brake is directly controlled by hydraulic pressure controlled by a second solenoid valve, and the fourth clutch is directly controlled by hydraulic pressure controlled by a third solenoid valve.

10 Claims, 6 Drawing Sheets

FIG.2

Operational chart

| Shift range and speed | | C1 | C2 | C3 | C4 | B1 | B2 | F1 | F2 | Engine brake |
|---|---|---|---|---|---|---|---|---|---|---|
| P | | | | | ◎ | ◎ | | | | |
| R | | | | ● | ◎ | ● | | | | Operated |
| N | | | | | ◎ | ◎ | | | | |
| D | 1 | ● | | | ◎ | | | | ▲ | |
| | 2 | ● | | | ◎ | | | | ▲ | |
| | 3 | ● | ● | | ◎ | | | | ▲ | |
| | 4 | ◎ | ● | | | | | | | |
| 3 (O.D. OFF) | 1 | ● | | | ◎ | | ● | | ▲ | Operated |
| | 2 | ● | | | ◎ | | | ▲ | ▲ | |
| | 3 | ● | ● | | | | ● | | △ | Operated |
| 2 | 1 | ● | | | ◎ | | ● | ▲ | ▲ | |
| | 2 | ● | | | ● | | | | △ | Operated |
| L | 1 | ● | | | ● | ● | | △ | △ | Operated |

● : Operated      △ : Removal of one-way clutch function by C4 or B1
◎ : Operated as needed      ▲ : Operated as reaction element

FIG.5

| solenoid valve operational chart | | | | |
|---|---|---|---|---|
| Shift range and speed | | S1 | S2 | S3 |
| P | P | OFF | OFF | OFF |
| R | R | OFF | OFF | OFF |
| N | N | OFF | OFF | OFF |
| D | 1 | ON | ON | OFF |
| | 2 | ON | OFF | selective control |
| | 3 | OFF | ON | selective control |
| | 4 | OFF | OFF | ON |
| 3 (O.D. OFF) | 1 | ON | ON | OFF |
| | 2 | ON | OFF | selective control |
| | 3 | OFF | ON | OFF |
| 2 | 1 | ON | ON | OFF |
| | 2 | ON | OFF | OFF |
| L | 1 | ON | ON | OFF |

HYDRAULIC CONTROL SYSTEM FOR AUTOMATIC TRANSMISSION

BACKGROUND OF THE INVENTION (a) Field of the Invention

The present invention relates to a hydraulic control system for an automatic transmission, and more particularly, to a hydraulic control system for hydraulically controlling a powertrain of a 4-speed automatic transmission that utilizes two one-way clutches.

(b) Description of the Related Art

Conventional automatic transmissions used in vehicles typically include a torque converter and a powertrain realized through a multi-stage gearshift mechanism that is connected to the torque converter. A hydraulic system that selectively operates one of three operational elements of the powertrain (sun gear, planetary carrier and ring gear) according to a driving state of the vehicle is also included.

In designing such an automatic transmission, a design concept and plan are formulated based on a variety of factors such as performance, durability, reliability, ability to be mass-produced, and manufacturing costs. After selecting a design concept, development is pursued in three broad areas of a mechanical section, a hydraulic control system, and an electronic control system.

The powertrain, which falls under the mechanical section category, is realized through a compound planetary gearset. The compound planetary gearset includes at least two simple planetary gearsets and performs control into a required shift stage. The hydraulic control system controls the powertrain. The hydraulic control system includes a pressure regulator for regulating hydraulic pressure generated by operation of an oil pump, a manual/automatic shift controller for forming a shift mode, a hydraulic pressure controller for controlling shift feel and responsiveness to enable smooth shifting, a damper clutch controller for operating a damper clutch of a torque converter, and a hydraulic pressure distributor for supplying suitable hydraulic pressures to friction elements.

The above elements control to which friction element of the powertrain hydraulic pressure will be supplied through solenoid valves that are On/Off and duty-controlled by a transmission control unit. Since in such an automatic transmission the friction elements are controlled to engaged and disengaged states by hydraulic pressure, the generation of shift shock during shifting is unavoidable. There are, nevertheless, ongoing efforts to minimize shift shock.

However, since it is difficult to improve upon the timing at which certain friction elements are controlled to engaged states while others are controlled to disengaged states during the extremely short interval of time provided, there are limits to how much shift shock can be reduced. Further, shift responsiveness is also negatively affected during this operation since momentary control into neutral is being performed. There are efforts to reduce the problems of shift shock and shift delay through the use of one-way clutches.

FIG. 1 shows a schematic view of a conventional automatic transmission powertrain that uses one-way clutches.

Rotational force generated by an engine E is transmitted to an input shaft 2 through a torque converter. The input shaft 2 transmits the received torque to first and second single pinion planetary gearsets 4 and 6, and shifting is realized through the complementary operation of the first and second single pinion planetary gearsets 4 and 6. Clutch hook-up, through which output is effected, is realized via a transfer drive gear 10, which is connected to a planet carrier 8 of the first single pinion planetary gearset 4.

To provide a clearer description, a sun gear 12, the planet carrier 8, and a ring gear 14 of the first single pinion planetary gearset 4 will preceded by the word "first" (e.g., the first sun gear 12), and a sun gear 16, a planet carrier 18, and a ring gear 20 of the second single pinion planetary gearset 6 will be preceded by the word "second".

In a state where the first planet carrier 8 is fixedly connected to the second ring gear 20, the first sun gear 12 is connected to the input shaft 2 via a first friction element C1, which operates in all forward speeds. Further, the second planet carrier 18 is connected to the input shaft 2 via a second clutch C2, which operates in forward third and fourth speeds, and the second sun gear 16 is connected to the input shaft 2 via the third clutch C3, which operates in a reverse R range.

The second planet carrier 18 operates as a reaction element through a first brake B1 and a first one-way clutch F1, which are mounted to a transmission housing 22. The first ring gear 14 is selectively operated together with the second planet carrier 18 through a fourth clutch C4 and a second one-way clutch F2, which are mounted in parallel. Also, the second sun gear 16 operates as a reaction element through a second brake B2, which is mounted to the transmission housing 22.

In the powertrain described above, shifting is realized by operation of the friction elements, which are controlled by the transmission control unit. Referring to FIG. 2, the different operative states of the friction elements and an engine brake according to shift range and shift speeds within the ranges (where applicable) are shown. The shifting operation of the powertrain will be described with reference to FIG. 1 and the chart of FIG. 2.

In a first speed, the first clutch C1 and the first and second one-way clutches F1 and F2 are operated. Accordingly, the first sun gear 12 acts as an input element, and the first ring gear 14 and the second planet carrier 18 act as reaction elements. Shifting into a second speed from the first speed is realized by operation of the second brake B2. That is, through the engagement of the second brake B2, input is realized through the first sun gear 12, and the second sun gear 16 acts as a reaction element, thereby realizing shifting into the second speed.

Shifting into the third speed from the second speed is realized by operation of the second clutch C2 and disengagement of the second brake B2. As a result, the first and second single pinion planetary gearsets 4 and 6 are linked such that output that is identical to the input results. Shifting into the fourth speed (i.e., overdrive) from the third speed is realized by the operation of the second brake B2 such that the second sun gear 16 acts as a reaction element.

To effect shifting into the reverse R range, the third clutch C3 and the first brake B1 are controlled to engaged states such that input is realized through the second sun gear 16 and the second planet carrier 18 acts as a reaction element.

In sum and to describe operational states of the friction elements for ranges not yet mentioned, shifting is realized as follows: the first clutch C1 operates in the first, second and third speeds; the second clutch C2 operates in the third and fourth speeds; the third clutch C3 operates in the reverse R range; the fourth clutch C4 operates in the park P, reverse R, neutral N and low L ranges, and as needed in the first, second and third speeds; the first brake B1 operates in the park P, reverse R, neutral N and low L ranges; and the second brake B2 operates in the second and fourth speeds.

With reference to FIG. 6, in a hydraulic control system for controlling the powertrain above, a D range pressure supplied from a manual valve 200 is supplied to the first clutch C1 and first, second and third pressure control valves 202, 204 and 206. Also, an L range pressure is supplied to the first pressure control valve 202, and an R range pressure is supplied to the third clutch C3 and the first brake B1.

In addition, the D range pressure supplied to the first pressure control valve 202 is selectively supplied, according to control by the first solenoid valve 208, to an operational side of the second brake B2, and the L range pressure is supplied to the first brake B1 in the low L range. A shuttle valve 210 is mounted on a line communicating with the first brake B1 and the third clutch C3, and hydraulic pressure is supplied to the first brake B1 depending on from which direction hydraulic pressure is supplied through this line.

The D range pressure supplied to the second pressure control valve 204 is selectively supplied to the second clutch C2 and the third pressure control valve 206 according to control by a second solenoid valve 212. Also, the D range pressure supplied to the third pressure control valve 206 is selectively supplied to the fourth clutch C4 according to control by a third solenoid valve 214, and the third pressure control valve 206 supplies hydraulic pressure from the second pressure control valve 204 to a non-operational side of the second brake B2.

However, in the conventional hydraulic control system as described above, since the system acts simply to control line pressure and the solenoid valves merely operate as switch valves to control timing, precise shift control is not possible. In particular, in the shift control between the second and third speeds, since a method of control is used in which the second brake is disengaged when the second clutch is engaged, precise control during shifting between the second and third speeds is not possible. Also, with the operation of the first brake and the fourth clutch, which enable operation of the engine brake, since a method is used in which line pressure is directly supplied, significant shift shock is generated.

Further, during manual shifting from the low 2 range to the low L range, the supply of line pressure to the first brake occurs simultaneously with the exhaust of operational side pressure of the second brake, resulting in the generation of substantial shift shock. Shifting into the reverse R range from the drive D range when travelling at a high speed results in shifting being forcedly performed by line-pressure, as well as possible damage to friction material.

In addition, if manual control into the low L range is performed when driving in the third or fourth speeds, engine rpm is excessively increased by the disengagement of the second clutch. Accordingly, the engine control unit abruptly performs engine fuel cut-off to protect the engine. However, shifting into neutral occurs during this control such that normal operation of the vehicle is not possible.

SUMMARY OF THE INVENTION

The present invention has been made in an effort to solve the above problems.

It is an object of the present invention to provide a hydraulic control system for a powertrain that utilizes two one-way clutches and realizes four forward speeds, in which the advantages of the one-way clutches are maximized during 1⇌2, 3⇌4, and 4⇌2 shifting.

To achieve the above object, the present invention provides a hydraulic control system for controlling an automatic transmission comprising a first clutch for transmitting power through a one-way clutch in first, second and third speeds; a fourth clutch for discontinuing an operation of the one-way clutch and which acts as an engine brake; a second brake operating in second and fourth speeds; a second clutch for transmitting power in third and fourth speeds; a first brake for discontinuing the operation of the one-way clutch in the first speed and acting as an engine brake, and operating in low L and reverse R ranges; and a third clutch for operating in the reverse R range, wherein hydraulic pressure controlled by a first solenoid valve is supplied and exhausted through operation of a switch valve to the second clutch and the first brake, the second brake is directly controlled by hydraulic pressure controlled by a second solenoid valve, and the fourth clutch is directly controlled by hydraulic pressure controlled by a third solenoid valve.

According to a feature of the present invention, the switch valve is provided to enable control by L range pressure.

According to another feature of the present invention, the fourth clutch is connected to enable use of line pressure by a third pressure control valve.

According to yet another feature of the present invention, the third pressure control valve includes a line on one side to supply line pressure to the fourth clutch and a line on another side to exhaust hydraulic pressure supplied to the fourth clutch, and which is controlled by hydraulic pressure controlled by the third solenoid valve and by control pressure, which is output pressure of the third pressure control valve.

According to still yet another feature of the present invention, the second brake is connected to enable control by a fail-safe valve.

According to still yet another feature of the present invention, the fail-safe valve includes lines on one side for supplying hydraulic pressure supplied from a second pressure control valve to the second brake, and lines on another side for exhausting the hydraulic pressure supplied to the second brake such that the fail-safe valve may be controlled by a first brake, second and fourth clutch pressure, and D range pressure that is supplied to an opposing side.

According to still yet another feature of the present invention, the fail-safe valve receives pressure from the second pressure control valve, and is controlled by control pressure of the second solenoid valve and output pressure of the second pressure control valve supplied to an opposite side.

According to still yet another feature of the present invention, operational pressure is exhausted by a fail-safe valve such that the second brake does not operate simultaneously with the first brake.

According to still yet another feature of the present invention, the switch valve receives hydraulic pressure from a first pressure control valve, the first pressure control valve including lines on one side for supplying D range pressure supplied from a manual valve and lines on another side for exhausting hydraulic pressure supplied to the switch valve, and which is structured to enable control by control pressure of the first solenoid valve and output pressure of the first pressure control valve, which is supplied to an opposing side.

According to still yet another feature of the present invention, the switch valve includes lines on one side for supplying hydraulic pressure from a first pressure control valve to the second clutch and for exhausting hydraulic pressure supplied to the first brake, and includes lines on another side for supplying hydraulic pressure from the first pressure control valve to the first brake and for exhausting hydraulic pressure supplied to the second clutch, the switch valve being controlled by an elastic member provided on one side therein and L range pressure supplied to a side opposite the elastic member.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 2 is a chart showing operational states of friction elements of the automatic transmission powertrain of FIG. 1 according to shift speed and range;

FIG. 5 is a chart showing operational states of solenoid valves according to a preferred embodiment of the present invention.

DETAILED DESCRIPTION OF THE PREFERRED EMBODIMENTS

Preferred embodiments of the present invention will now be described in detail with reference to the accompanying drawings.

Figure 3:
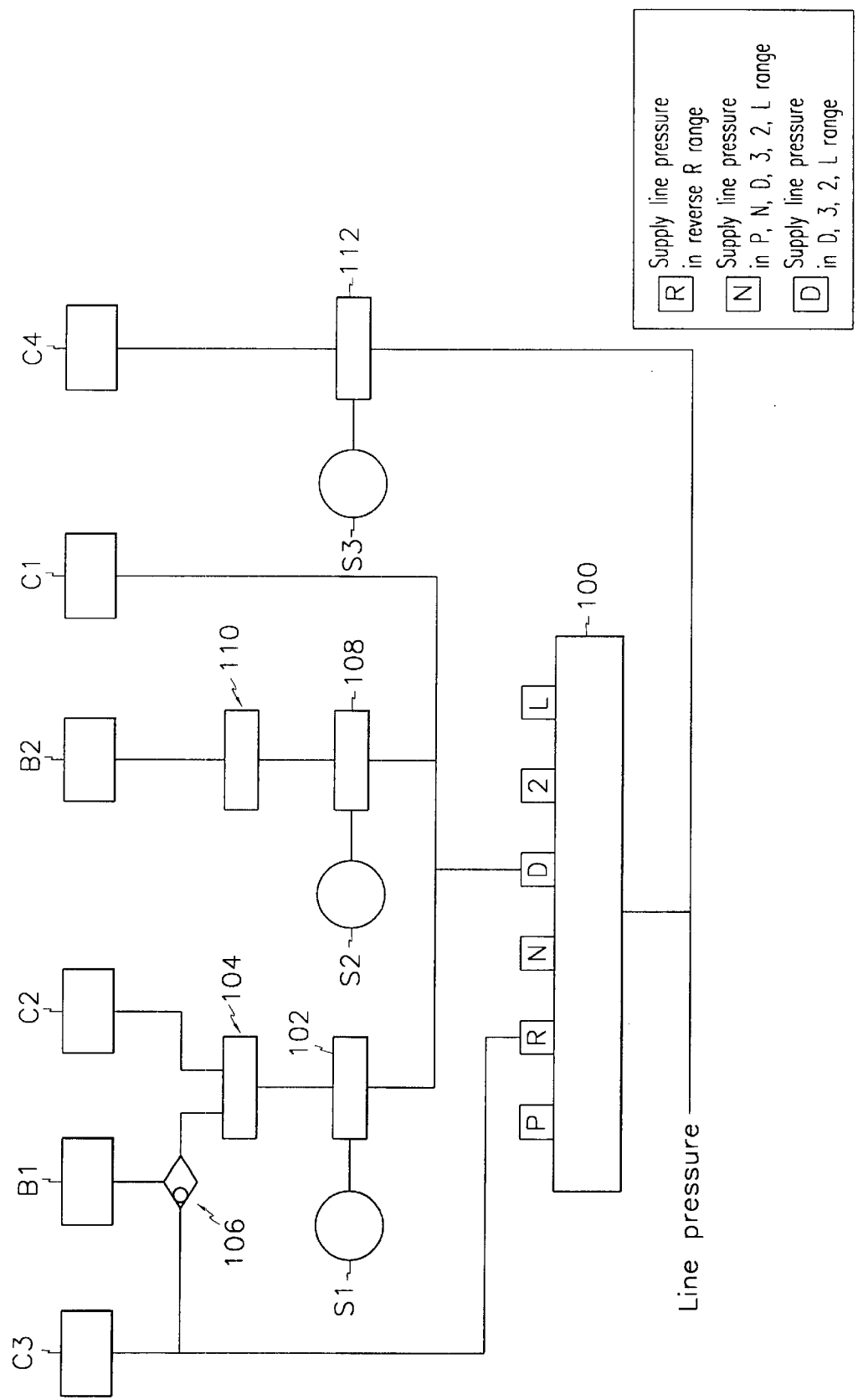
FIG. 3 is a schematic view of a hydraulic control system for an automatic transmission according to a preferred embodiment of the present invention.

FIG. 3 shows a schematic view of a hydraulic control system for an automatic transmission according to a preferred embodiment of the present invention. Only hydraulic pressure lines reaching friction elements C1, C2, C3, C4, B1 and B2 from a manual valve 100 are shown.

The manual valve 100 of the present invention is structured such that line pressure is supplied via an R port in a reverse R range; through P, N, D, 3, 2, L ports in a neutral N range; and through D, 3, 2, L ports in a drive D range. No particular configuration for the manual valve 100 is outlined in the present invention. This element may be provided having a variety of structures.

The friction elements C1, C2, C3, C4, B1 and B2 operate as in the conventional hydraulic control system. That is, the first clutch C1 operates in first, second and third speeds; the second clutch C2 operates in the third and fourth speeds; the third clutch C3 operates in the reverse R range; the fourth clutch C4 operates in the park P, reverse R, neutral N and low L ranges, and as needed in the first, second and third speeds; the first brake B1 operates in the park P, reverse R, neutral N and low L ranges; and the second brake B2 operates in the second and fourth speeds (see the chart of FIG. 2).

The first clutch C1 directly receives D range pressure from the manual valve 100. The second clutch C2 and the first brake B1 jointly use an output pressure of a first pressure control valve 102, which is controlled by a first solenoid valve S1. That is, the output pressure of the first pressure control valve 102 is controlled by a switch valve 104 to be selectively supplied to the second clutch C2 and the first brake B1.

Further, the first brake B1 is connected to receive R range pressure supplied to the third clutch C3 by a shuttle valve 106 in the reverse R range. The second brake B2 receives output pressure of a second pressure control valve 108, which is controlled by a second solenoid valve S2. A fail-safe valve 110 is mounted between the second pressure control valve 108 and the second brake B2. Also, the fourth clutch C4 realizes a connection to directly receive line pressure from a third pressure control valve 112, which is controlled by a third solenoid valve S3. A variable force (VF) solenoid valve may be used for each of the above solenoid valves S1, S2 and S3. The VF solenoid valve has the advantage of enabling precise control.

Figure 4:
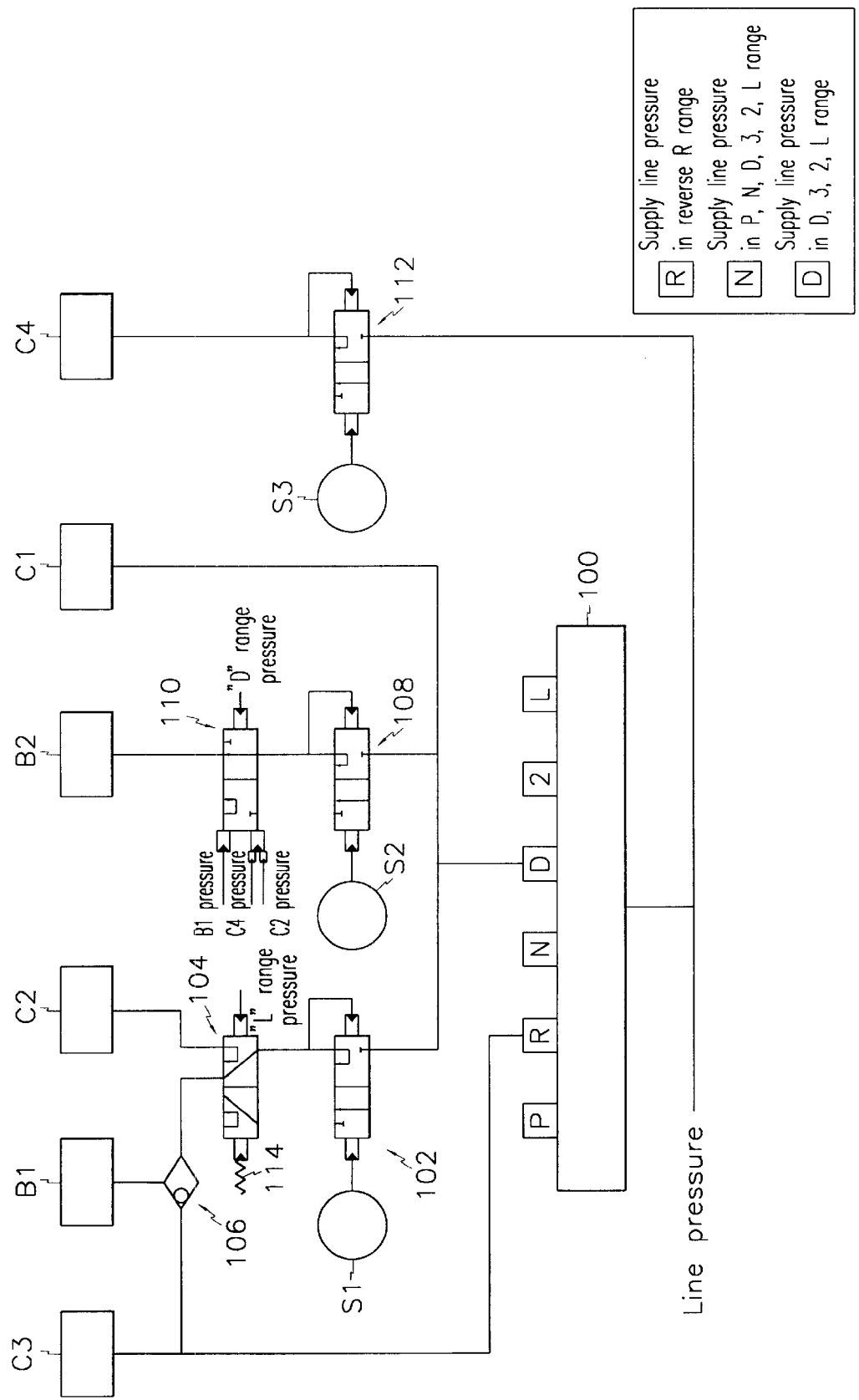
FIG. 4 is a circuit diagram of a hydraulic control system according to a preferred embodiment of the present invention.
Figure 6:
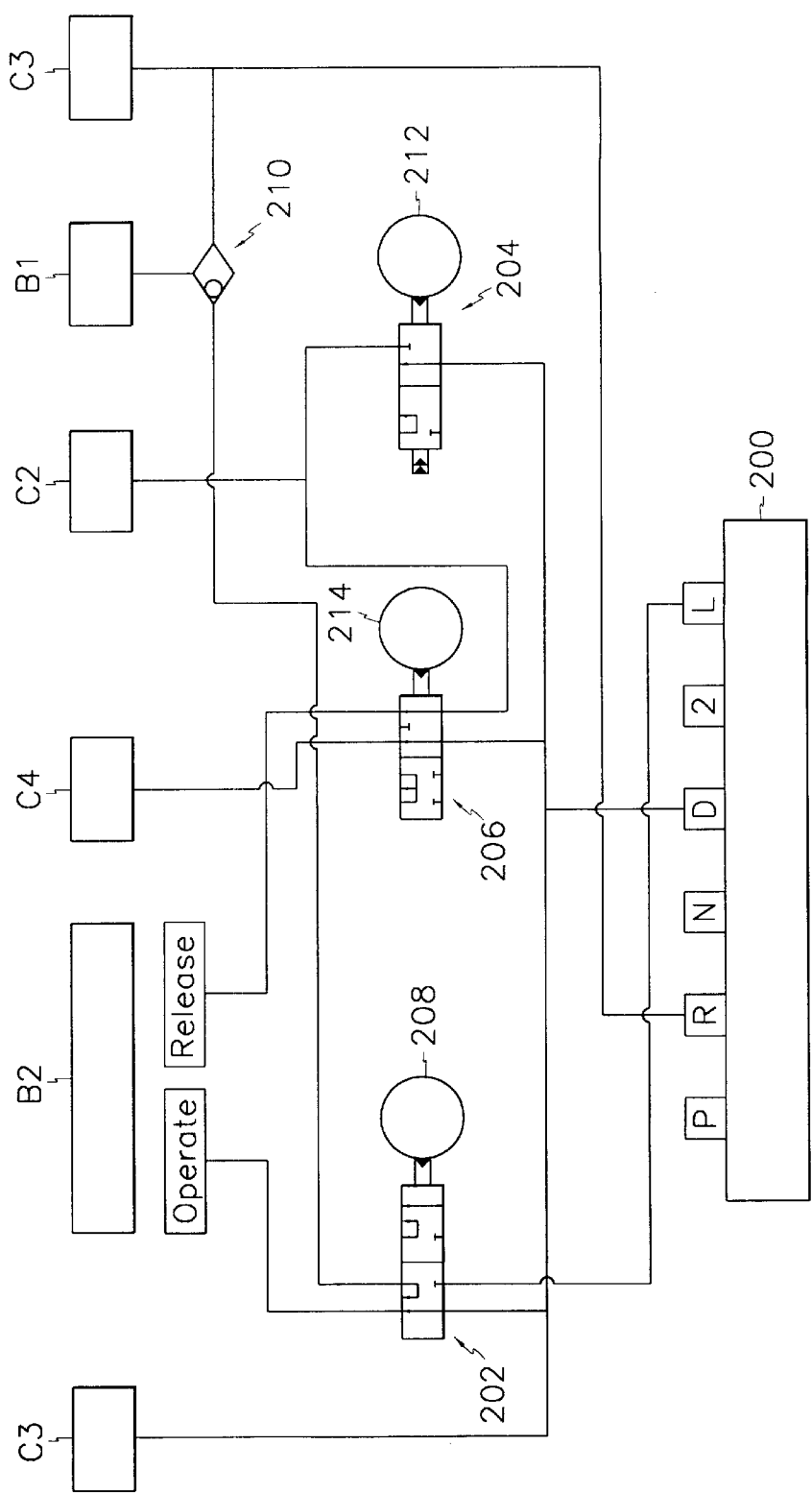
FIG. 6 is a schematic view of a conventional hydraulic control system.

FIG. 4 shows a circuit diagram of a hydraulic control system according to a preferred embodiment of the present invention.

An input port side of a first pressure control valve 102 is connected to a manual valve 100 to receive line pressure, and an output port side of the first pressure control valve 102 is connected to an input port side of a switch valve 104 to receive control pressure supplied to a first brake B1 and a second clutch C2, which are connected to the switch valve 104. The first pressure control valve 102 is able to control line pressure by hydraulic pressure controlled by a first solenoid valve S1 and by control pressure connected to an output side port.

The switch valve 104 includes a port for exhausting hydraulic pressure supplied to the second clutch C2 and hydraulic pressure supplied to the first brake B1. Also, the switch valve 104 includes an elastic member 114, and is structured such that control pressure resisting an elastic force of the elastic member 114 is received from L range pressure. Since in a reverse R range hydraulic pressure is directly supplied from the manual valve 100 to the first brake B1, the switch valve 104 is used to control the first brake B1 in a low L range.

An input side port of a second pressure control valve 108 receives D range pressure from the manual valve 100, and an output side port receives hydraulic pressure from a fail-safe valve 110. The fail-safe valve 110 directly supplies control pressure to a second brake B2. The second pressure control valve 108 is controlled by hydraulic pressure controlled by a second solenoid valve S2, and by control pressure, which is output pressure of the second pressure control valve 108, supplied to an opposite side of the second pressure control valve 108.

The fail-safe valve 110 includes a port through which hydraulic pressure supplied to the second brake B2 is exhausted. The fail-safe valve 110 is controlled by hydraulic pressure supplied to the first brake B1, second and fourth clutch pressure, and D range pressure supplied to an opposing side. Also, the fail-safe valve 110 operates such that the second brake B2 and the first brake B1 do not simultaneously operate, or such that the second brake B2 is disengaged if the second clutch C2 and a fourth clutch C4 operate simultaneously.

A third pressure control valve 112 includes a line on one side to supply line pressure to the fourth clutch C4, and a line to exhaust hydraulic pressure supplied to the fourth clutch C4. Also, the third pressure control valve 112 is controlled by hydraulic pressure controlled by a third solenoid valve S3 and by control pressure, which is output pressure of the third pressure control valve 112.

The first, second and third solenoid valves S1, S2 and S3 are controlled as shown in FIG. 5 by a transmission control unit.

By the operation of the solenoid valves S1, S2 and S3, each friction element is controlled to states as shown in the chart of FIG. 2. That is, the first clutch C1 receives D range pressure from the manual valve 100 in the first, second and third speeds; the second clutch C2 receives hydraulic pressure through the first pressure control valve 102 and the switch valve 104 in the third and fourth speeds; and the third clutch C3 receives R range pressure directly from the manual valve 100 in the reverse R range.

Also, the fourth clutch C4 may operate in all shift speeds except the fourth speed, and particularly when a function of a one-way clutch is discontinued and engagement of an engine brake is required. The first brake B1 directly receives hydraulic pressure from the manual valve 100 in the reverse R range, and receives hydraulic pressure through the first pressure control valve 102 and the switch valve 104 in the low L range. The second brake B2 receives hydraulic pressure through the second pressure control valve 108 and the fail-safe valve 110 in the second speed.

The operation of the friction elements in each shift range is as follows.

In a park P range, since this is a state where no power is transmitted, all friction elements may be disengaged. However, to prepare for shifting into the reverse R range or a drive D range, the fourth clutch C4 is engaged. In the reverse R range, the third clutch C3 and the first brake B1 are engaged, and the fourth clutch C4 may be engaged to prepare for shifting into other ranges. In a neutral N range, since this is also a state where no power is transmitted, all friction elements may be disengaged. However, to prepare for shifting into the reverse R range or the drive D range, the fourth clutch C4 is engaged.

Figure 1:
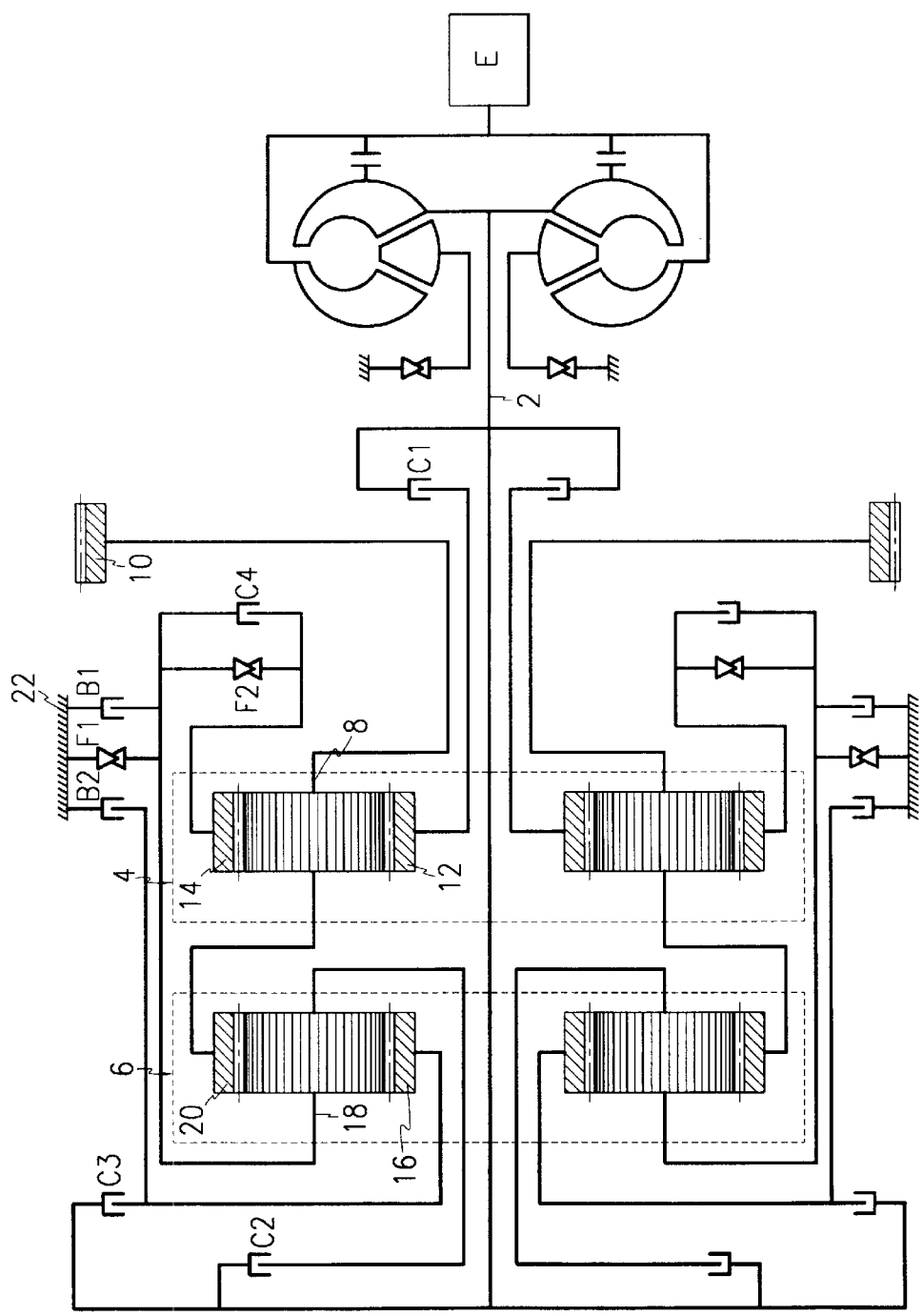
FIG. 1 is a schematic view of a conventional automatic transmission powertrain.

Further, with reference also to FIG. 1, in a first speed of the drive D range, the first ring gear 14 and the second planet carrier 18 operate as reaction elements by the second one-way clutch F2 and the first one-way clutch to maintain the first speed. Accordingly, the engine brake is not engaged, even with the operation of the fourth clutch C4.

In a second speed of the D range, shifting into the second speed is maintained by the first clutch C1, the second brake B2 and the second one-way clutch F2. Accordingly, the engine brake is not engaged by the second one-way clutch F2. However, if the fourth clutch C4 is engaged, the engine brake is engaged.

In a third speed of the drive D range, the third speed is maintained by the first clutch C1 and the second clutch C2, and the engine brake is not engaged by the second one-way clutch F2. However, if the fourth clutch C4 is operated, the engine brake is engaged.

In a fourth speed of the drive D range, the fourth speed is maintained by the second clutch C2 and the second brake B2, and the engine brake is engaged. However, the first clutch C1 is not able to perform its function by the second one-way clutch F2.

In the low L range, since the first speed is maintained by the first clutch C1, the second one-way clutch F2, the fourth clutch C4, the first one-way clutch F1, and the first brake B1, the engine brake is not engaged. At this time, the second one-way clutch F2 is not able to perform its function by the fourth clutch C4, the first one-way clutch F1 is not able to perform its function by the first brake B1.

In the hydraulic control system of the present invention described above, hydraulic pressure is supplied by control of all friction elements (except the first and third clutches) using independent solenoid valves. Accordingly, precise shift control is possible and shift shock is minimized.

In particular, in an automatic transmission powertrain utilizing two one-way clutches, precise control between second and third speeds is possible through the independent control of the second clutch and the second brake. Also, since line pressure is not directly supplied to the fourth clutch, and instead control pressure is supplied to the fourth clutch, shift shock is further minimized.

Furthermore, during 1⇌2, 3⇌4, and 4⇌2 shifting, since the fourth clutch, the second clutch and the second brake are effectively controlled, the advantages of the one-way clutches are maximized.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A hydraulic control system for controlling an automatic transmission comprising:
   a first clutch for transmitting power through a one-way clutch in first, second and third speeds;
   a fourth clutch for discontinuing an operation of the one-way clutch and which acts as an engine brake;
   a second brake operating in second and fourth speeds;
   a second clutch for transmitting power in third and fourth speeds;
   a first brake for discontinuing the operation of the one-way clutch in the first speed and acting as an engine brake, and operating in low L and reverse R ranges; and
   a third clutch for operating in the reverse R range,
   wherein hydraulic pressure controlled by a first solenoid valve is supplied and exhausted through operation of a switch valve to the second clutch and the first brake, the second brake is directly controlled by hydraulic pressure controlled by a second solenoid valve, and the fourth clutch is directly controlled by hydraulic pressure controlled by a third solenoid valve.

2. The hydraulic control system of claim 1 wherein the switch valve is provided to enable control by L range pressure.

3. The hydraulic control system of claim 1 wherein the fourth clutch is connected to enable use of line pressure by a third pressure control valve.

4. The hydraulic control system of claim 3 wherein the third pressure control valve includes a line on one side to supply line pressure to the fourth clutch and a line on another side to exhaust hydraulic pressure supplied to the fourth clutch, and is controlled by hydraulic pressure controlled by the third solenoid valve and by control pressure, which is output pressure of the third pressure control valve.

5. The hydraulic control system of claim 1 wherein the second brake is connected to enable control by a fail-safe valve.

6. The hydraulic control system of claim 5 wherein the fail-safe valve includes lines on one side for supplying hydraulic pressure supplied from a second pressure control valve to the second brake, and lines on another side for exhausting the hydraulic pressure supplied to the second brake such that the fail-safe valve may be controlled by a first brake, second and fourth clutch pressure, and D range pressure that is supplied to an opposing side.

7. The hydraulic control system of claim 5 wherein the fail-safe valve receives pressure from a second pressure control valve, and is controlled by control pressure of the second solenoid valve and output pressure of the second pressure control valve supplied to an opposite side.

8. The hydraulic control system of claim 1 wherein operational pressure is exhausted by a fail-safe valve such that the second brake does not operate simultaneously with the first brake.

9. The hydraulic control system of claim 1 wherein the switch valve receives hydraulic pressure from a first pressure control valve, the first pressure control valve including lines on one side for supplying D range pressure supplied from a manual valve and lines on another side for exhausting hydraulic pressure supplied to the switch valve, and which is structured to enable control by control pressure of the first solenoid valve and output pressure of the first pressure control valve, which is supplied to an opposing side.

10. The hydraulic control system of claim 1 wherein the switch valve includes lines on one side for supplying hydraulic pressure from a first pressure control valve to the second clutch and for exhausting hydraulic pressure supplied to the first brake, and includes lines on another side for supplying hydraulic pressure from the first pressure control valve to the first brake and for exhausting hydraulic pressure supplied to the second clutch, the switch valve being controlled by an elastic member provided on one side therein and L range pressure supplied to a side opposite the elastic member.

* * * * *